United States Patent [19]
Valentine et al.

[11] Patent Number: 5,151,701
[45] Date of Patent: Sep. 29, 1992

[54] POLICE RADAR DETECTORS FOR DETECTING RADAR SIGNALS AND DETERMINING THE DIRECTIONAL ORIGIN OF THE SIGNAL SOURCE

[75] Inventors: Michael D. Valentine; Clarence R. Groth; Stephen R. Scholl; Marwan E. Nusair, all of Cincinnati, Ohio

[73] Assignee: Valentine Research, Inc., Cincinnati, Ohio

[21] Appl. No.: 780,262

[22] Filed: Oct. 21, 1991

Related U.S. Application Data

[63] Continuation-in-part of Ser. No. 659,625, Feb. 25, 1991, Pat. No. 5,083,129.

[51] Int. Cl.$^5$ .............................................. G01S 7/40
[52] U.S. Cl. .................................................... 342/20
[58] Field of Search ................... 342/20; 455/227, 345

[56] References Cited

U.S. PATENT DOCUMENTS

| | | |
|---|---|---|
| 3,660,844 | 5/1972 | Potter . |
| 3,956,749 | 5/1976 | Magorian . |
| 4,182,990 | 1/1980 | Coffin et al. . |
| 4,315,261 | 2/1982 | Mosher . |
| 4,404,561 | 9/1983 | Mulder et al. . |
| 4,613,989 | 9/1986 | Fende et al. . |
| 4,622,553 | 11/1986 | Baba et al. . |
| 4,626,857 | 12/1986 | Imazski . |
| 4,630,054 | 12/1986 | Martinson . |
| 4,633,521 | 12/1986 | Liautaud . |
| 4,668,952 | 5/1987 | Imazski et al. . |
| 4,686,499 | 8/1987 | Furnish . |
| 4,692,763 | 9/1987 | Gregg, Jr. . |
| 4,700,191 | 10/1987 | Manor .............................. 342/20 X |
| 4,719,462 | 1/1988 | Hawkins . |
| 4,725,840 | 2/1988 | Orazietti . |
| 4,750,215 | 6/1988 | Biggs . |
| 4,949,088 | 8/1990 | Byan et al. . |
| 5,001,777 | 3/1991 | Liautaud .......................... 342/20 X |

OTHER PUBLICATIONS

New Snooper System Radar Detectors advertisement.
Sonaradar advertisement.
Find the Hidden Radar Detector, Car and Driver, Mar. 1985, Csaba Csere and Don Sherman.
"Microwave Passive Direction Finding", A Wiley-Interscience Publication, Steven E. Lipsky, 1987.

*Primary Examiner*—Mark Hellner
*Attorney, Agent, or Firm*—Killworth, Gottman, Hagan & Schaeff

[57] ABSTRACT

A police radar detector detects both the presence of radar signals incident upon a motor vehicle using the detector and also determines the direction of origin of the source of detected radar signals and alerts the operator of the motor vehicle of the presence and source direction of the radar signals. The radar detector includes at least two antennas and preferably three or more antennas with detector circuitry shared among the antennas in a single detector housing. One of the antennas is directed generally toward the front of the motor vehicle and, for a three antenna embodiment, the second and third antennas are directed at angles of generally 120° to the left and 120° to the right of the front of the vehicle. As the police speed radar frequency bands are scanned or swept, each potential radar signal which is detected is processed to determine the direction of origin of the signals. To determine the direction of origin of sensed radar signals, the signals are detected in all antennas with the signal strengths in the different antennas being compared to determine the direction of origin of the signals. It is preferred to identify the direction of the radar source as being to the front of the vehicle, to the rear of the vehicle, to the left side of the vehicle or to the right side of the vehicle.

12 Claims, 3 Drawing Sheets

| ANGLE θ | ΔP (dB) |
|---|---|
| FRONT 0° | 30.2 |
| 10° | 29.6 |
| 20° | 28.0 |
| 30° | 25.7 |
| 40° | 23.1 |
| TH1 50° | 20.1 |
| 60° | 16.4 |
| 70° | 10.5 |
| SIDE 80° | 6.6 |
| 90° | −4.5 |
| 100° | −15.7 |
| 110° | −19.7 |
| TH2 120° | −20.0 |
| 130° | −22.1 |
| 140° | −24.8 |
| 150° | −26.5 |
| 160° | −27.6 |
| 170° | −28.1 |
| REAR 180° | −28.1 |

FIG. 6

POLICE RADAR DETECTORS FOR DETECTING RADAR SIGNALS AND DETERMINING THE DIRECTIONAL ORIGIN OF THE SIGNAL SOURCE

This application is a continuation-in-part of U.S. patent application Ser. No. 07/659,625 filed Feb. 25, 1991 now U.S. Pat. No. 5,083,129.

BACKGROUND OF THE INVENTION

The present invention relates generally to police radar detectors used in motor vehicles and, more particularly, to a police radar detector which not only detects the presence of radar signals incident on a motor vehicle but also determines the direction of the source of the radar signals and alerts the operator of the motor vehicle of both radar signal presence and source direction.

Radar signals have been commonly used by police for some time to determine the speed of motor vehicles. In response to radar speed monitoring and to signal motor vehicle operators when such monitoring is taking place, police radar detectors have likewise been used for almost a coincident period of time. Currently available radar detectors indicate the presence of radar signals, the frequency band of detected signals and the relative field strength of detected signals. The widely varying operating procedures for using police radar and the proliferation of other signals assigned to the same frequency bands as police radar has led to the need for police radar detectors which give more information than that provided by current radar detectors.

For example, police radar units are often deployed along the side of the roadway, to measure a motor vehicle's speed as it advances toward the unit. In some instances, the police radar may measure the speed of a motor vehicle after it has passed and is travelling away from the unit. Police vehicles may also be equipped with radar units which are operated while the police vehicles are moving, using reflections from stationary objects to measure the speed of the police vehicle itself, and reflections from a target vehicle to measure relative speed, and using both measured speeds to determine the actual speed of the target vehicle.

When a vehicle equipped with a radar detector is within microwave range of a police radar unit which transmits a radar signal, the detector alerts the vehicle operator that the signal is present typically through a combination of audible and visual signals. As the user approaches the source of the radar signal, signal strength normally indicated by the typical detector increases. As the vehicle passes the source of the radar signal, the indicated signal strength drops, usually very quickly, since a forwardly aimed directional antenna of the detector is no longer pointed in the general direction of the signal source, and is now responding to reflections of the signal from objects in front of the vehicle. If the police radar unit is at the side of the road in a clearly visible location, the vehicle operator can easily correlate the detected signal and its apparent source.

If, on the other hand, the police radar unit is not visible, for example because it is in an unmarked car, it is dark, or the radar signal source is actually on a different nearby roadway not visible to the vehicle operator, the source of the radar signal cannot readily be determined. Further, under such conditions, when the detector indicates a drop in signal strength apparently indicating that the vehicle has passed a radar source, the vehicle operator cannot be sure whether the source is now behind the vehicle or if the drop in signal strength is due to terrain changes caused by movement of the vehicle.

In addition to the possible variations in police radar signal encounters, there are many different sources of microwave signals in the frequency bands allocated to police radar by the U.S. Federal Communications Commission (FCC) since these bands have also been allocated for transmitters performing other functions. For example, motion-detecting burglar alarms, automatic door openers, and low-power speed measuring devices used in sports also operate in the frequency bands allocated to police radar. Unfortunately, police radar detectors cannot distinguish between signals generated by a police radar transmitter and those generated by other devices which utilize microwave signals within the same frequency bands. The inability to distinguish these signals is a disadvantage of police radar detectors, particularly in urban areas where the number of non-police microwave signals may be relatively high.

Accordingly, there is a need for an improved police radar detector which can assist the operator of a motor vehicle using the detector to accurately interpret signals generated by the detector to alert the operator of police radar signals incident on the motor vehicle.

SUMMARY OF THE INVENTION

This need is met by the police radar detectors of the present invention which not only detect the presence of radar signals incident upon a motor vehicle using one of the detectors but also determine the direction of origin of the source of detected radar signals. The radar detectors of the present invention then signal an operator of a motor vehicle of the presence of radar signals and also inform the operator of the direction from which the signals are coming to assist the operator in evaluating the signals. In the preferred form of the invention, the radar detector includes at least two antennas in a single housing with the signals from the at least two antennas being processed by the same circuitry which is shared by the antennas.

When only two antennas are provided, preferably, one of the antennas is directed generally toward the front of the motor vehicle with the other antenna being directed generally toward the rear of the motor vehicle. As the relevant frequency bands which correspond to police speed monitoring radar are scanned or swept, each potential radar signal which is detected is processed to determine the direction of origin of the signals. To determine the direction of origin of incident radar signals, the signals are detected in both antennas with the signal strengths in the two antennas being used to determine the direction of origin of the signals. The direction of origin can be resolved to some precision; however, with only two antennas there is an right side/left side ambiguity such that it is preferred to identify the direction of the radar source as being to the front of the vehicle, to the rear of the vehicle or to the side of the vehicle. Empirically derived tables set thresholds for the determination of radar source directions.

When more than two antennas are provided, the right side/left side ambiguity is eliminated. For example, if three antennas are provided, one facing generally forward and the other two facing approximately 120° relative to forward to the left and right sides of the motor vehicle, the direction of the radar source can be precisely located along both the right side and the left side of the motor vehicle. Even though the precise direction of the radar source can be identified, it is preferred to identify the directions the radar source as being to the front of the vehicle, to the rear of the vehicle, to the left side of the vehicle or to the right side of the vehicle. Empirically derived tables can also be used for the determination of radar source directions for embodiments having more than two antennas.

In accordance with one aspect of the present invention, a motor vehicle radar signal detector for alerting an operator of a motor vehicle to incoming radar signals comprises receiver means for receiving incoming radar signals at frequencies within at least one frequency band. The receiver means comprises a first antenna aimed in a first direction relative to the motor vehicle, a second antenna aimed in a second direction relative to the motor vehicle, and a third antenna aimed in a third direction relative to the motor vehicle. The first, second and third directions of the antennas are different from one another. Radar signal detector means generate radar identification signals which identify incoming radar signals. Connector means provide for connecting signals from the receiver means to the radar signal detector means. Processor means control the connector means to selectively connect signals from the first, second and third antennas to the radar signal detector means. The processor means is responsive to radar identification signals generated by the radar signal detector means to identify radar signals coming from the first, second and third directions relative to the motor vehicle. The processor means also generates direction signals identifying the direction of origin of incoming radar signals. Alarm means are provided for alerting an operator of a motor vehicle upon identification of incoming radar signals, the alarm means including direction indicating means responsive to the direction signals for identifying the direction of origin of incoming radar signals.

The radar identification signals indicate the strengths of identified radar signals and the processor means is responsive to the strengths of the signals received by the first, second and third antennas to determine the angle of incidence of the signals on the motor vehicle relative to the first direction. The alarm means include means for identifying the angle of incidence of the identified radar signals. The first direction is generally to the front of the motor vehicle, the second direction is generally 120° relative to the first direction to the left side of the motor vehicle and the third direction is generally 120° relative to the first direction to the right side of the motor vehicle.

In accordance with another aspect of the present invention, a motor vehicle radar signal detector for alerting an operator of a motor vehicle to incoming radar signals comprises receiver means for receiving incoming radar signals at frequencies within at least one frequency band. The receiver means comprises a first antenna which is generally forwardly directed, a second antenna which is generally directed at an angle of 120° relative to the forward direction of the first antenna to the left side of the motor vehicle, and a third antenna which is generally directed at an angle of 120° relative to the forward direction of the first antenna to the right side of the motor vehicle. Detector means are provided for generating radar identification signals which identify incoming radar signals. Connector means provide for connecting signals from the receiver means to the detector means. Processor means control the connector means to selectively connect signals from the first, second and third antennas to the detector means. The processor means is responsive to radar identification signals generated by the detector means to identify the angle of incidence of radar signals on the motor vehicle. The processor means also generates direction signals identifying the direction of origin of incoming radar signals. Alarm means are provided for alerting an operator of a motor vehicle upon identification of incoming radar signals. The alarm means includes direction indicating means responsive to the direction signals for identifying the direction of origin of incoming radar signals.

Preferably, the first, second and third antennas are positioned within a single housing for the motor vehicle radar signal detector. The radar identification signals indicate the strengths of signals received by the first, second and third antennas. The processor means further provides for determining whether signals are incident on the motor vehicle from the front, back, right side or left side of the vehicle in response to the strengths of signals received by the first, second and third antennas. The alarm means further includes means for identifying whether the identified radar signals are coming from the front, back, right side or left side of the motor vehicle. Since the primary threat is to the front of the vehicle, the portion of time that signals from the first antenna are applied to the detector means to detect radar signals coming from in front of the motor vehicle is greater than the portion of time that signals from the second and third antennas are applied to the detector means to detect radar signals coming generally from behind and to the sides of the motor vehicle.

In accordance with yet another aspect of the present invention, a method of operating a motor vehicle radar signal detector for alerting an operator of a motor vehicle to incoming radar signals comprises the steps of: detecting radar signals within at least one frequency band which are incident on the motor vehicle from a first direction; detecting radar signals within at least one frequency band which are incident on the motor vehicle from a second direction; detecting radar signals within at least one frequency band which are incident on the motor vehicle from a third direction; and, alerting the operator of the motor vehicle of the presence and incident direction of detected radar signals.

In accordance with still another aspect of the present invention, a method of operating a motor vehicle radar signal detector for alerting an operator of a motor vehicle to incoming radar signals comprises the steps of: sensing radar signals received by a first antenna which is aimed in a first direction; sensing radar signals received by a second antenna which is aimed in a second direction; sensing radar signals received by a third antenna which is aimed in a third direction, the first second and third directions being different from one another; determining the strength of sensed radar signals received by the first antenna; determining the strength of sensed radar signals received by the second antenna; determining the strength of sensed radar signals received by the third antenna; identifying radar signals sensed in the first, second and third antennas which are from the same source; comparing the strengths of same source sensed radar signals as received in the first, second and third antennas to determine the angle of incidence of the same source sensed radar signals on the motor vehicle; and, activating alarm means in response to sensed incoming signals incident on the motor vehicle to alert the operator of the motor vehicle of the presence of sensed incoming signals and the angle of incidence of such signals.

In accordance with a further aspect of the present invention, a motor vehicle radar signal detector for alerting an operator of a motor vehicle to incoming radar signals comprises receiver means for receiving incoming radar signals at frequencies within at least one frequency band. The receiver means comprises at least first and second antennas, the first antenna aimed in a first direction relative to the motor vehicle and the second antenna aimed in a second direction relative to the motor vehicle and different from the first direction. Radar signal detector means are provided for generating radar identification signals which identify incoming radar signals. Connector means connect signals from the receiver means to the radar signal detector means. Processor means are provided for controlling the connector means to selectively connect signals from the at least first and second antennas to the radar signal detector means. The processor means is responsive to radar identification signals generated by the radar signal detector means to identify radar signals coming from the first direction relative to the motor vehicle and radar signals coming from the second direction relative to the motor vehicle The processor means also provides for generating direction signals identifying the direction of origin of incoming radar signals. Alarm means are provided for alerting an operator of a motor vehicle upon identification of incoming radar signals, the alarm means including direction indicating means responsive to the direction signals for identifying whether the identified radar signals are coming from the first direction or are coming from the second direction.

Preferably, the at least first and second antennas are positioned within a single housing for the motor vehicle radar signal detector.

In accordance with yet another further aspect of the present invention, a motor vehicle radar signal detector for alerting an operator of a motor vehicle to incoming radar signals comprises receiver means for receiving incoming radar signals at frequencies within at least one frequency band. The receiver means comprises at least first, second and third antennas, the first antenna being aimed in a first direction relative to the motor vehicle, the second antenna being aimed in a second direction relative to the motor vehicle, and the third antenna being aimed in a third direction relative to the motor vehicle, the first, second and third directions being different from one another. Radar signal detector means generate radar identification signals which identify incoming radar signals. Connector means provide for connecting signals from the receiver means to the radar signal detector means. Processor means control the connector means to selectively connect signals from the at least first, second and third antennas to the radar signal detector means. The processor means is responsive to radar identification signals generated by the radar signal detector means to identify radar signals coming from the first, second and third directions relative to the motor vehicle. The processor means also generates direction signals identifying the direction of origin of incoming radar signals Alarm means alert an operator of a motor vehicle upon identification of incoming radar signals, the alarm means including direction indicating means responsive to the direction signals for identifying the direction of origin of incoming radar signals. Preferably, the at least first, second and third antennas are positioned within a single housing for the motor vehicle radar signal detector It is thus an object of the present invention to provide an improved police radar detector which provides additional information to the user of the detector to assist the operator in interpreting and responding to detected radar signals; to provide an improved police radar detector which provides additional information to the user of the radar detector by incorporating at least two antennas directed in different directions into a single housing with circuitry shared by the at least two antennas for detecting radar signals and alerting an operator of detected radar signals and the direction of origin of the signals; and, to provide an improved police radar detector which provides additional information to the user of the radar detector wherein signals received by at least two differently directed antennas are processed to determine the direction of the radar source relative to the motor vehicle making use of the detector and alerting an operator of the presence and direction of origin of the signals.

Other objects and advantages of the invention will be apparent from the following description, the accompanying drawings and the appended claims

DETAILED DESCRIPTION OF THE INVENTION

Figure 1:
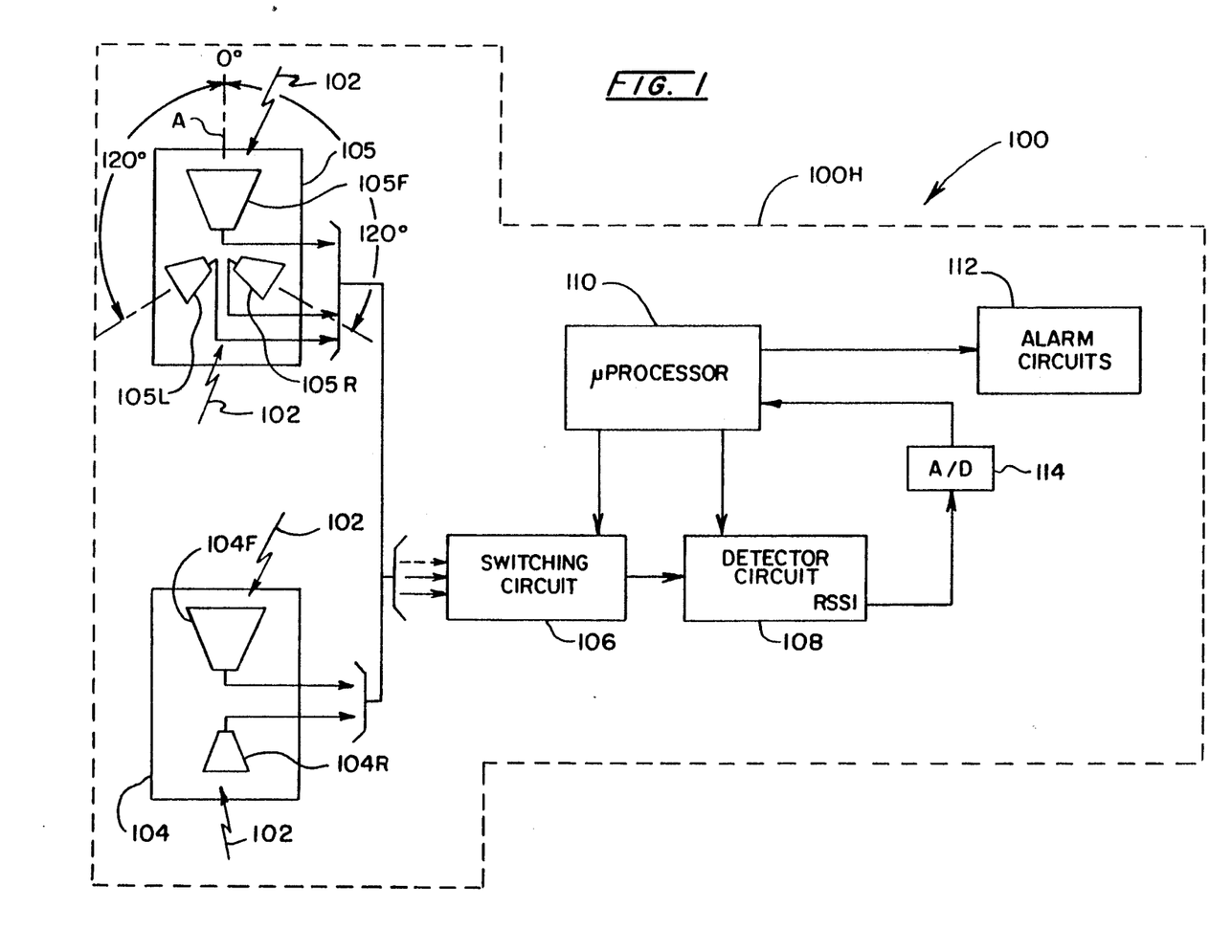
FIG. 1 is a schematic block diagram of a radar detector illustrating two alternate embodiments the present invention.

As previously noted, the present invention relates to a motor vehicle radar detector which not only detects the presence of radar signals incident on a motor vehicle but also determines the direction of the source of the radar signals and alerts the operator of the motor vehicle of both the presence of radar signals and the source direction or angular orientation of the source relative to the motor vehicle The radar detector 100 of FIG. 1 illustrates two embodiments which monitor one or more police radar bands to sense incident radar signals 102. The incident radar signals 102 are received by receiver means which comprise either antennas 104 or antennas 105. For a two antenna embodiment of the detector 100, the antennas 104 comprise a generally forwardly directed antenna 104F and a generally rearwardly directed antenna 104R. While the antennas 104F, 104R are illustrated as generally facing the front and the rear of a vehicle including the detector 100, it is to be understood that the antenna directions can be different for given applications and as a result of existing or future requirements. Signals received by the antennas 104F, 104R are passed to connector means comprising a switching circuit 106 in the illustrated embodiment for connecting signals from the antennas 104F, 104R to detector means which provides for generating radar identification signals identifying incoming radar signals.

In the illustrated embodiments of FIG. 1, detector means comprises any appropriate radar detector circuit 108 capable of generating a received signal strength indicator (RSSI) output signal which indicates the signal strength of radar signals detected by the detector circuit 108. The switching circuit 106 and radar detector circuit 108 are not important to the invention of the present application, can take a wide variety of forms and can include amplifiers, mixers, diplexers, and other circuitry commonly used in the radar detector field as are well known to those skilled in the art. Accordingly, the switching circuit 106 and the radar detector 108 will not be further described herein.

Processor means taking the form of a microprocessor 110 in the illustrated embodiment control the switching circuit 106 to selectively connect signals from the antennas 104F and 104R to the detector circuit 108. Operation and control of the detector circuit 108, for example for the detection of radar signals in different frequency bands allocated to police radar signals, is also performed by the microprocessor 110. The microprocessor 110 additionally controls alarm circuits 112 to communicate information regarding detected radar signals to the operator of a motor vehicle utilizing the detector 100 by means of one or more alarm tones and/or visual indicators which are included within the alarm circuits 112. As shown in FIG. 1, the antennas 104F and 104R are preferably positioned within a single housing which can be the radar detector housing 100H, schematically represented by the dotted line box of FIG. 1.

Figure 2:
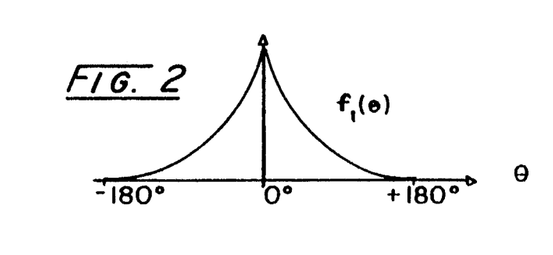
FIG. 2 is a graph of an antenna pattern function $f_1(\theta)$ for one of the frequency bands of a forwardly directed antenna of one of the embodiments of FIG. 1.
Figure 3:
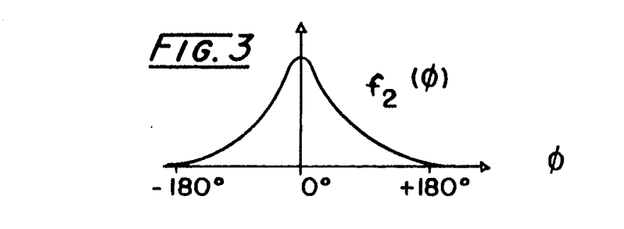
FIG. 3 is a graph of an antenna pattern function $f_2(\phi)$ for one of the frequency bands of a rearwardly directed antenna of one of the embodiments of FIG. 1.
Figure 4:
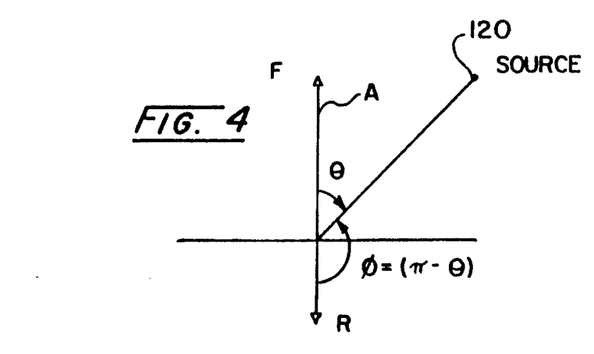
FIG. 4 is a graph of a radar source oriented at an angle $\theta$ relative to the forward direction of a vehicle and at an angle $\phi$, $(\pi-\theta)$, relative to the rear direction of the vehicle.

The determination of the direction of the source of radar signals incident on a motor vehicle for the two antenna embodiment of FIG. 1 will now be described with reference to FIGS. 2-8. FIG. 2 is a graphic representation of an antenna pattern function $f_1(\theta)$ for one of the frequency bands of the forwardly directed antenna 104F where $\theta$ represents the incident angle relative to the forward direction of the motor vehicle utilizing the radar detector 100. Similarly, FIG. 3 is a graphic representation of an antenna pattern function $f_2(\phi)$ for the same frequency band of the rearwardly directed antenna 104R where $\phi$ represents the incident angle relative to the rear direction of the motor vehicle utilizing the radar detector 100 with $\phi$ equalling $(\pi - \theta)$. Thus, as shown in FIG. 4, a radar source 120 is oriented at an angle $\theta$ relative to the forward direction F of the vehicle and at an angle $\phi$, $(\pi - \theta)$, relative to the rear direction R of the vehicle.

Figure 5:
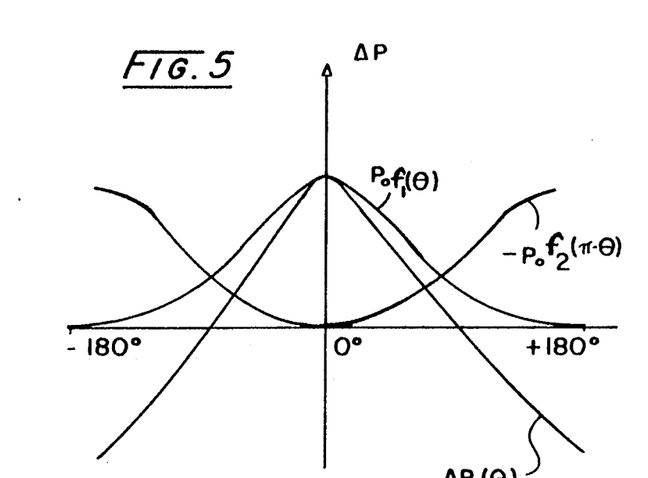
FIG. 5 is a graphic overlay of the functions $\Delta P(\theta)$, $P_0 f_1(\theta)$ and $P_0 f_2(\pi-\theta)$ illustrating the difference between the weighted powers of the signals received by the front and rear antennas of one of the embodiments of FIG. 1.

FIG. 5 is a graphic overlay representing the functions $\Delta P(\theta)$, $P_0 f_1(\theta)$ and $P_0 f_2(\pi - \theta)$ wherein $P_0$ is the power of the incident radar signal and $\Delta P(\theta)$ is the difference between the weighted power of the signal received in the forwardly directed antenna 104F, $P_0 f_1(\theta)$, and the power of the signal received in the rearwardly directed antenna 104R, $P_0 f_2(\pi - \theta)$, thus:

$$\Delta P(\theta) = P_0 f_1(\theta) - P_0 f_2(\pi - \theta).$$

Figure 6:
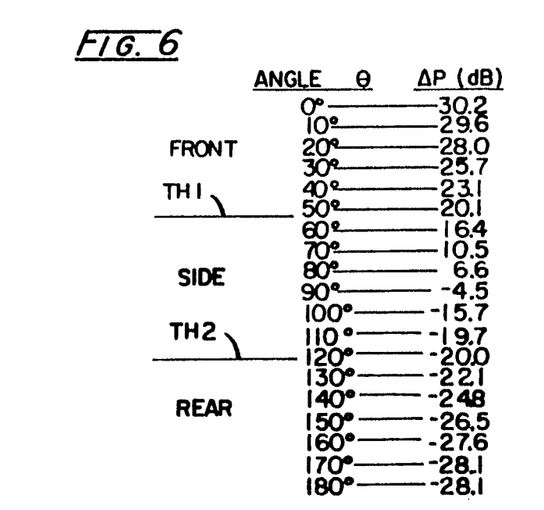
FIG. 6 is an empirically determined table for determining the angular orientation of a radar source relative to a vehicle utilizing the two antenna radar detector of FIG. 1.

As can be seen from FIG. 5, $\Delta P(\theta)$ is symmetric with respect to $\pm \theta$ and is monotonic for $0 \leq \theta \leq \pi$. In practice, a table is prepared for each band to be monitored, for example as shown in FIG. 6 wherein $\Delta P(\theta)$, listed in decibels (dB), has been determined for every 10° of the source angle $\theta$. Once the specific forwardly directed antenna 104F and the rearwardly directed antenna 104R have been selected for use in the detector 100, the table of FIG. 6 is prepared empirically by physically positioning a unit fixed power source at the frequency of interest at the corresponding angular positions and recording the power received by the antennas 104F and 104R. A different table is used for each frequency band since the antenna patterns are quite different for the different frequency bands which are allocated for police radar. If multiple bands are monitored, as is typically the case, weighting of the signals received in the different bands may be performed to approximately equalize the effective signal levels for corresponding power level sources in the different frequency bands. Such weighting is inherent in the tables which are empirically generated for a given pair of antennas 104F, 104R.

Figure 7:
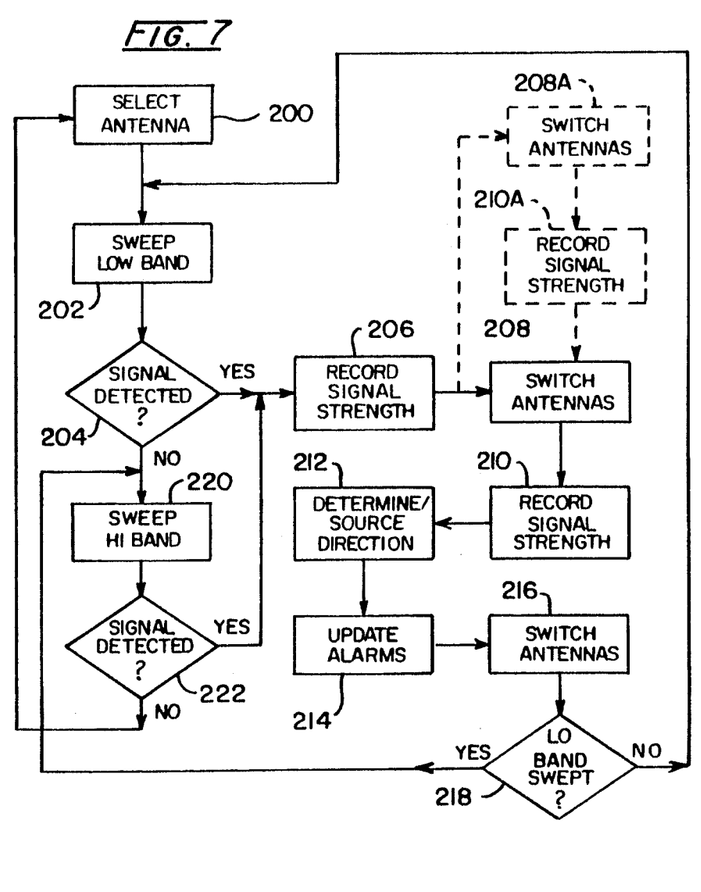
FIG. 7 is a flow chart of the operations of the two embodiments of radar detectors of FIG. 1 in determining the angular orientation of a radar source relative to a vehicle utilizing the radar detector of the present invention.

Operation of the two antenna directional police radar detector 100 of FIG. 1 will now be described with reference to the flow chart of FIG. 7. While the detector circuit 108 can be used to monitor or sweep only one or any reasonable number of frequency bands (four frequency bands are commonly swept in state-of-the-art police radar detectors), it will be described as monitoring or sweeping at least two frequency bands, one frequency band in the lower range of frequencies allocated to police radar detectors (LO BAND) and one frequency band in the upper range of frequencies allocated to police radar detectors (HI BAND). The microprocessor 110 initially selects the antenna 104F or 104R the signals from which are first to be connected to the radar detector circuit 108 and used for the current sweep, see block 200. As previously noted, the forwardly directed antenna 104F is selected more often than the rearwardly directed antenna 104R due to the greater threat in front of a vehicle and relatively quicker closing speeds. In any event, after one of the antennas 104F or 104R is selected, the low band is swept in a conventional manner, see block 202.

If any radar signals are detected, see block 204, the strength of the signals is recorded by the microprocessor 110, see block 206. In both of the illustrated embodiments of the present invention, output signals from an analog to digital (A/D) converter 114, which are connected to the microprocessor 110, are utilized as the signal strength since the digital signals are easily processed and stored by the microprocessor 110. The frequencies of detected signals are maintained in accordance with the present invention for signal direction processing by the microprocessor 110 which stops the detector circuit 108 upon initial signal detection.

As soon as a signal has been detected and the detector circuit 108 has been stopped, the selection of the antennas 104 is switched and the same signal is detected for the other antenna, see block 208. The signal strength of the signal in the other antenna is recorded, see block 210. At this point, a radar signal will have been detected, the strength of the signal in both antennas 104F and 104R will have been determined and recorded by the microprocessor 110. The microprocessor 110 next determines the angular direction of the source 120 from the motor vehicle utilizing the radar detector 100, see block 212. The determination of the direction of the detected radar source can be performed by table lookup using the appropriate table for the band including the detected radar signal and the signal strengths of the signal in the antennas 104F and 104R. While it would be possible to precisely identify the angular direction of the radar source 120 except for right side/left side ambiguity as discussed above, for the two antenna motor vehicle radar detector 100 of FIG. 1, identification of one of three directions appears to be preferred for the operator of a motor vehicle including the detector 100: front, side or rear.

Thus, as shown in FIG. 6, it is possible to select upper and lower thresholds TH1 and TH2 with the direction of the radar source 120 being identified as: from the front if the power difference $\Delta P(\theta)$ exceeds the upper threshold TH1; from the rear if the power difference $\Delta P(\theta)$ is below the lower threshold TH2; and, from the side if the power difference $\Delta P(\theta)$ is equal to or between the upper threshold TH1 and the lower threshold TH2. As shown in FIG. 6, the thresholds TH1 and TH2 correspond approximately to +20 db and −20 db, respectively which corresponds to approximately 0°14 50° front, 50°–120° side, and 120°–180° rear. Of course the precise selections of the designations of front, side and rear depend upon user comfort and will ultimately be determined during field testing of the detector 100. The actual designations of front, side and rear can be programmed into the microprocessor 110 and may even be made selectable if deemed desirable from a user's standpoint.

Figure 8:
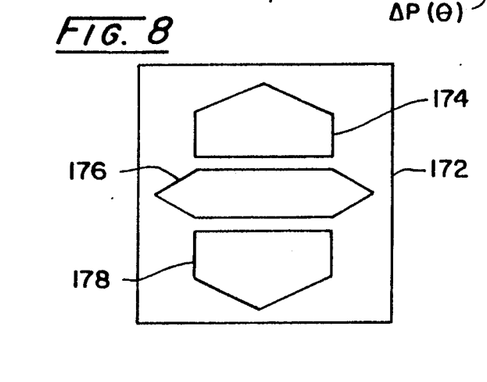
FIG. 8 is an elevational view of a three directional display for use in the two antenna radar detector of FIG. 1.

The alarms are next updated based on the preceding determinations, see block 214. In addition to an audible indication of a detected radar signal, a visual indication will be given to the operator which visual indication will indicate the identified direction of the radar source 120. For example, as shown in FIG. 8 a three element visual display 172 will be provided. For a radar source identified as being in front of the vehicle, an upward or forwardly directed arrow indicator 174 will be lighted; for a radar source identified as being to the side of the vehicle, a double-ended, sidewardly directed arrow indicator 176 will be lighted; and, for a radar source identified as being to the rear of the vehicle, a downwardly or rearwardly directed arrow indicator 178 will be lighted.

The antennas 104 are then switched again to restore the radar detector to receive signals from the antenna from which it was receiving signals when a signal was detected, see block 216. If the low band was being swept and was not completely swept, the sweep of the low band continues from where the sweep was interrupted, see block 218. If the low band was completely swept or the high band was being swept, the sweep of the high band commences or is continued from where it was interrupted, see block 220. Any radar signals which are detected during the sweep of the high band are handled in the manner just described for the low band. After the low band and high band have been swept, the microprocessor 110 is returned to the point where it once again selects the antenna to be used for the next sweeping operation, see blocks 222 and 200, respectively. It should be apparent that the detector 100 can be used to monitor or sweep a single frequency band or any reasonable number of frequency bands which have been allocated to police radar.

While two antenna radar detectors appear to be somewhat less expensive and less complicated than radar detectors including three or more antennas, such as the three antenna radar detector of FIG. 1, in some applications it may be preferred to incorporate more than two antennas into a radar detector of the present invention. As previously noted, embodiments which include three or more antennas permit the right side/left side ambiguity to be eliminated. Accordingly, description of a three antenna radar detector illustrated in FIG. 1 will now be described.

The second or three antenna embodiment of the radar detector 100 illustrated in FIG. 1 includes receiver means which comprise the antennas 105. The antennas 105 include a first antenna 105F aimed in a first direction, a second antenna 105L aimed in a second direction and a third antenna 105R aimed in a third direction. As is apparent from FIG. 1, the first, second and third directions are different from one another In the illustrated embodiment of the three antenna radar detector, the first direction is generally to the front of the motor vehicle in which the radar detector 100 is being used; the second direction is generally 120° relative to the first direction to the left side of the motor vehicle and the third direction is generally 120° relative to the first direction to the right side of the motor vehicle.

Each of the antennas 105F, 105L and 105R has a known antenna pattern function $f(\theta)$ comparable to the graphic representations of the antenna patterns $f_1(\theta)$ and $f_2(\phi)$ illustrated in FIGS. 2 and 3. The amplitude of detected radar signals received in each of the antennas 105F, 105L and 105R are used to determine the direction of the source of the received signals. For example, $f_F(\theta)$, the radiation pattern of the antenna 105F, can correspond to the radiation pattern shown in FIG. 2; $f_L(\theta)$, the radiation pattern of the antenna 105L, can correspond to the radiation pattern of FIG. 3; and, $f_R(\theta)$, the radiation pattern for the antenna 105R, can correspond to the radiation pattern of FIG. 3.

If a radar signal arrives at a motor vehicle including the three antenna radar detector 100 at an angle $\theta$ relative to the central axis A of the vehicle, i.e. 0°, then the signal will be received in each of the antennas 105F, 105L and 105R with the signal strengths represented by the corresponding radiation pattern functions:

Antenna 105F Amplitude = $P_0 f_F(\theta)$;
Antenna 105L Amplitude = $P_0 f_L(120° - \theta)$; and
Antenna 105R Amplitude = $P_0 f_R(120° + \theta)$.

Knowing all three amplitudes and all three radiation pattern functions allows the angle, $\theta$, to be calculated. In practice, a table is prepared for each band to be monitored since such lookup tables are quick and convenient for the microprocessor 110. While look-up tables for the three antenna embodiment of the radar detector 100 would be comparable to the table of FIG. 6, it would be a double entry table or effectively two dimensional.

For additional embodiments of radar detectors in accordance with the present invention using more than three antennas, the antennas preferably are divided into sets of three antennas and analyzed to arrive at the angle θ. The resulting multiple answers are then averaged to give the best result. Three antennas are the minimum needed to completely determine the direction of a radar source in the horizontal plane. With additional antennas, i.e. more than three antennas, the results are further verified and corroborated however at a cost of additional processing time as will be apparent to those skilled in the art. Accordingly, the three antenna embodiment of the radar detector 100 appears to be preferred.

Operation of the three antenna directional police radar detector 100 of FIG. 1 is substantially the same as the two antenna embodiment as described above with reference to the flow chart of FIG. 7. The additional steps required for operation of the three antenna radar detector include an additional antenna switch and recordation of the signal strength for the corresponding antenna, see dotted line blocks 208A and 210A. As with the two antenna embodiment, both an audible and a visible indication of a detected radar signal are given to the operator with the visual indication indicating the identified direction of the radar source 120.

Figure 9:
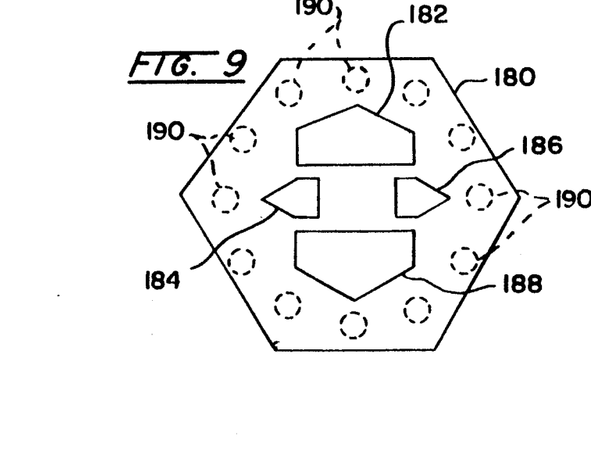
FIG. 9 is an elevational view of a four/multiple directional display for use in the three antenna radar detector of FIG. 1.

For example, as shown in FIG. 9, a four element visual display 180 is provided. For a radar source identified as being in front of the vehicle, an upward or forwardly directed arrow indicator 182 is lighted; for a radar source identified as being to the left side of the vehicle, a left directed arrow indicator 184 is lighted; for a radar source identified as being to the right side of the vehicle, a right directed arrow indicator 186 is lighted; and, for a radar source identified as being to the rear of the vehicle, a downwardly or rearwardly directed arrow indicator 188 is lighted. In addition to or instead of the arrow indicators 182, 184, 186 and 188, a series of indicators 190 can be provided around the periphery of the display 180.

Having thus described the police radar detector identifying angular direction of radar sources of the present invention in detail and by reference to preferred embodiments thereof, it will be apparent that modifications and variations are possible without departing from the scope of the invention defined in the appended claims.

What is claimed is:

1. A motor vehicle radar signal detector for alerting an operator of a motor vehicle to incoming radar signals, said detector comprising:

receiver means comprising a first antenna aimed in a first direction relative to said motor vehicle, a second antenna aimed in a second direction relative to said motor vehicle, and a third antenna aimed in a third direction relative to said motor vehicle for receiving incoming radar signals at frequencies within at least one frequency band, said first, second and third directions being different from one another;

radar signal detector means for generating radar identification signals which identify incoming radar signals;

connector means for connecting signals from said receiver means to said radar signal detector means;

processor means for controlling said connector means to selectively connect signals from said first, second and third antennas to said radar signal detector means and responsive to radar identification signals generated by said radar signal detector means to identify radar signals coming from said first, second and third directions relative to said motor vehicle and to generate direction signals identifying the direction of origin of incoming radar signals; and alarm means for alerting an operator of a motor vehicle upon identification of incoming radar signals, said alarm means including direction indicating means responsive to said direction signals for identifying the direction of origin of incoming radar signals.

2. A motor vehicle radar signal detector for alerting an operator of a motor vehicle to incoming radar signals as claimed in claim 1 wherein said first, second and third antennas are positioned within a single housing for said motor vehicle radar signal detector.

3. A motor vehicle radar signal detector for alerting an operator of a motor vehicle to incoming radar signals as claimed in claim 1 wherein said radar identification signals indicate the strengths of identified radar signals and said processor means is responsive to the strengths of the signals received by said first, second and third antennas to determine the angle of incidence of said signals on said motor vehicle relative to said first direction, said alarm means including means for identifying the angle of incidence of the identified radar signals.

4. A motor vehicle radar signal detector for alerting an operator of a motor vehicle to incoming radar signals as claimed in claim 3 wherein said first direction is generally to the front of said motor vehicle, said second direction is generally 120° relative to said first direction to the left side of said motor vehicle and said third direction is generally 120° relative to said first direction to the right side of said motor vehicle.

5. A motor vehicle radar signal detector for alerting an operator of a motor vehicle to incoming radar signals, said detector comprising:

receiver means comprising a first antenna which is generally forwardly directed, a second antenna which is generally directed at an angle of 120° relative to the forward direction of said first antenna to the left side of said motor vehicle and a third antenna which is generally directed at an angle of 120° relative to the forward direction to the right side of said motor vehicle for receiving incoming radar signals at frequencies within at least one frequency band;

detector means for generating radar identification signals which identify incoming radar signals;

connector means for connecting signals from said receiver means to said detector means;

processor means for controlling said connector means to selectively connect signals from said first, second and third antennas to said detector means and responsive to radar identification signals generated by said detector means to identify the angle of incidence of radar signals on said motor vehicle, and to generate direction signals identifying the direction of origin of incoming radar signals; and alarm means for alerting an operator of a motor vehicle upon identification of incoming radar signals, said alarm means including direction indicating means responsive to said direction signals for identifying the direction of origin of incoming radar signals.

6. A motor vehicle radar signal detector for alerting an operator of a motor vehicle to incoming radar signals as claimed in claim 5 wherein said first, second and third antennas are positioned within a single housing for said motor vehicle radar signal detector.

7. A motor vehicle radar signal detector for alerting an operator of a motor vehicle to incoming radar signals as claimed in claim 5 wherein said radar identification signals indicate the strengths of signals received by said first, second and third antennas and said processor means further provides for determining whether signals are incident on said motor vehicle from the front, back, right side or left side thereof in response to the strengths of signals received by said first, second and third antennas, said alarm means further including means for identifying whether the identified radar signals are coming from the front, back, right side or left side of said motor vehicle.

8. A motor vehicle radar signal detector for alerting an operator of a motor vehicle to incoming radar signals as claimed in claim 5 wherein the portion of time that signals from said first antenna are applied to said detector means to detect radar signals coming from in front of said motor vehicle is greater than the portion of time that signals from said second and third antennas are applied to said detector means to detect radar signals coming generally from behind and to the sides of said motor vehicle.

9. A method of operating a motor vehicle radar signal detector for alerting an operator of a motor vehicle to incoming radar signals, said method comprising the steps of:
sensing radar signals received by a first antenna which is aimed in a first direction;
sensing radar signals received by a second antenna which is aimed in a second direction;
sensing radar signals received by a third antenna which is aimed in a third direction, said first second and third directions being different from one another;
determining the strength of sensed radar signals received by said first antenna;
determining the strength of sensed radar signals received by said second antenna;
determining the strength of sensed radar signals received by said third antenna;
identifying radar signals sensed in said first, second and third antennas which are from the same source;
comparing the strengths of same source sensed radar signals as received in said first, second and third antennas to determine the angle of incidence of said same source sensed radar signals on said motor vehicle; and
activating alarm means in response to sensed incoming signals incident on said motor vehicle to alert the operator of said motor vehicle of the presence of sensed incoming signals and the angle of incidence of such signals.

10. A motor vehicle radar signal detector for alerting an operator of a motor vehicle to incoming radar signals, said detector comprising:
receiver means comprising at least first and second antennas positioned within a single housing for said motor vehicle radar signal detector, said first antenna aimed in a first direction relative to said motor vehicle and said second antenna aimed in a second direction relative to said motor vehicle and different from said first direction for receiving incoming radar signals at frequencies within at least one frequency band;
radar signal detector means for generating radar identification signals which identify incoming radar signals;
connector means for connecting signals from said receiver means to said radar signal detector means;
processor means for controlling said connector means to selectively connect signals from said at least first and second antennas to said radar signal detector means and responsive to radar identification signals generated by said radar signal detector means to identify radar signals coming from said first direction relative to said motor vehicle and radar signals coming from said second direction relative to said motor vehicle, and to generate direction signals identifying the direction of origin of incoming radar signals; and
alarm means for alerting an operator of a motor vehicle upon identification of incoming radar signals, said alarm means including direction indicating means responsive to said direction signals for identifying whether the identified radar signals are coming from said first direction or are coming from said second direction.

11. A motor vehicle radar signal detector for alerting an operator of a motor vehicle to incoming radar signals, said detector comprising:
receiver means comprising at least first, second and third antennas positioned within a single housing for said motor vehicle radar signal detector, said first antenna being aimed in a first direction relative to said motor vehicle, said second antenna aimed in a second direction relative to said motor vehicle, and said third antenna being aimed in a third direction relative to said motor vehicle for receiving incoming radar signals at frequencies within at least one frequency band, said first, second and third directions being different from one another;
radar signal detector means for generating radar identification signals which identify incoming radar signals;
connector means for connecting signals from said receiver means to said radar signal detector means;
processor means for controlling said connector means to selectively connect signals from said at least first, second and third antennas to said radar signal detector means and responsive to radar identification signals generated by said radar signal detector means to identify radar signals coming from said first, second and third directions relative to said motor vehicle and to generate direction signals identifying the direction of origin of incoming radar signals; and
alarm means for alerting an operator of a motor vehicle upon identification of incoming radar signals, said alarm means including direction indicating means responsive to said direction signals for identifying the direction of origin of incoming radar signals.

12. A method of operating a motor vehicle radar signal detector for alerting an operator of a motor vehicle to incoming radar signals as claimed in claim 9 further comprising the step of housing said first, second and third antennas in a single housing for said motor vehicle radar signal detector.

* * * * *

UNITED STATES PATENT AND TRADEMARK OFFICE
CERTIFICATE OF CORRECTION

PATENT NO. : 5,151,701

DATED : September 29, 1992

INVENTOR(S) : Michael D. Valentine et al

It is certified that error appears in the above-identified patent and that said Letters Patent is hereby corrected as shown below:

Column 14, line 31, "antenna aimed" should be

--antenna being aimed--.

Signed and Sealed this

Second Day of November, 1993

*Attest:*

BRUCE LEHMAN

*Attesting Officer*    Commissioner of Patents and Trademarks